May 7, 1963    P. G. ARMITAGE ETAL    3,088,418
CONVEYOR SYSTEMS
Filed Nov. 13, 1961    3 Sheets-Sheet 2

3,088,418
CONVEYOR SYSTEMS
Philip George Armitage, Gostrow, Brede, and Albert Edward Brookes, Bush Bank, Suckley, England; said Armitage assignor to Guinness Hop Farms Limited, London, England, and said Brookes assignor to Bruff Manufacturing Company Limited, Suckley, England
Filed Nov. 13, 1961, Ser. No. 151,978
Claims priority, application Great Britain Nov. 15, 1960
9 Claims. (Cl. 104—91)

The object of this invention is to provide a convenient conveyor system for feeding hop bines, or the like to a plucking machine.

A conveyor system according to the invention comprises an endless circuit track which extends through the plucking machine and a loading position removed from the machine, a plurality of trolleys engaging the tracks and from which the bines or the like can be suspended, elevating means adapted to engage trolleys coming from the loading position and to push them up an inclined portion of the track to a point from whence they can gravitate down the track to the machine, driving means associated with the machine for traversing the trolleys relative to plucking means and for delivering the trolleys to a position from whence they can gravitate along the track to the loading position, and two independently releasable means for arresting movement of the trolleys on the track at positions between the elevating means and the machine, and between the machine and the loading position respectively.

Figure 1:
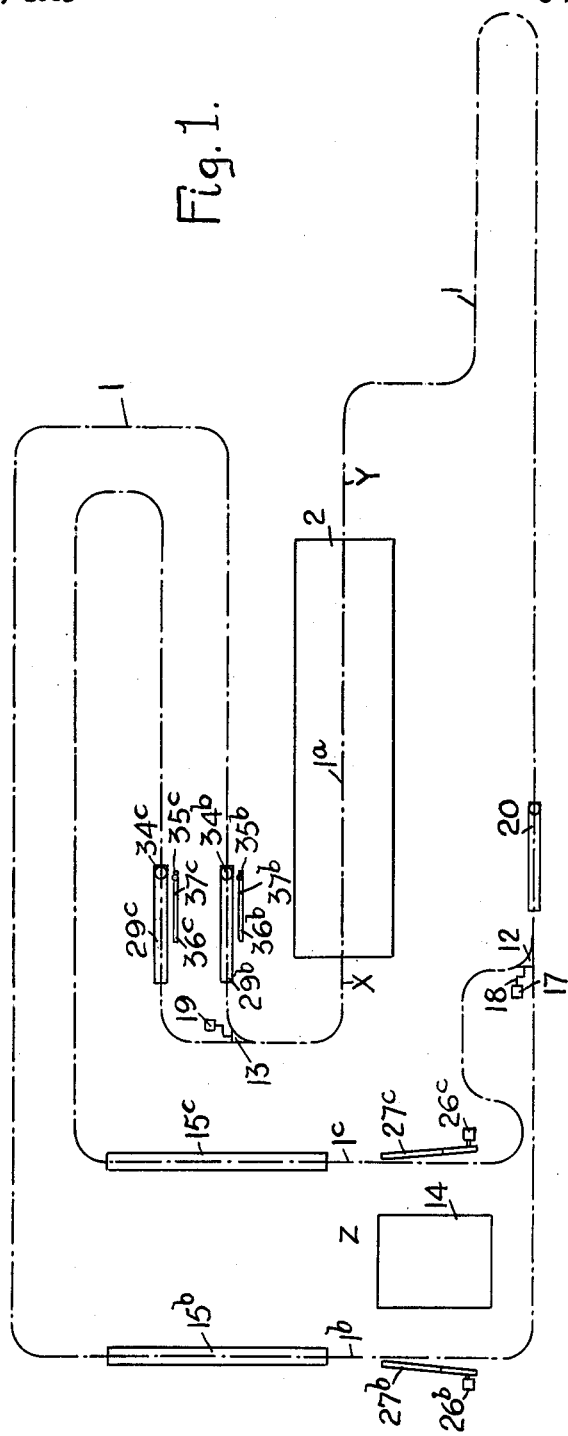
Figure 2:
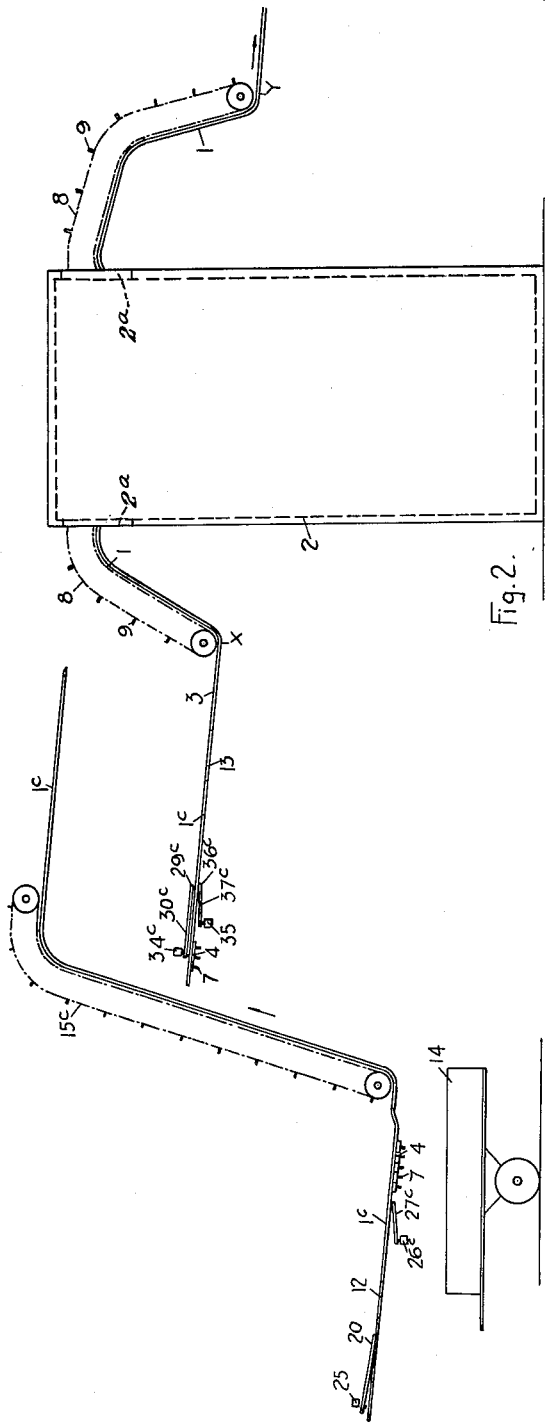
Figure 3:
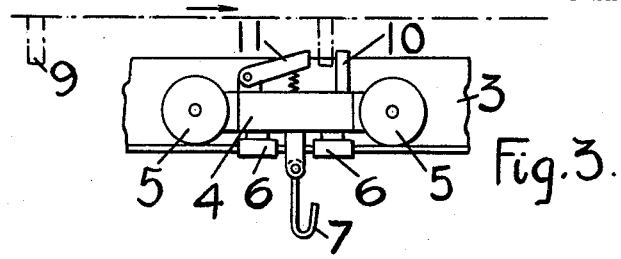
Figure 4:
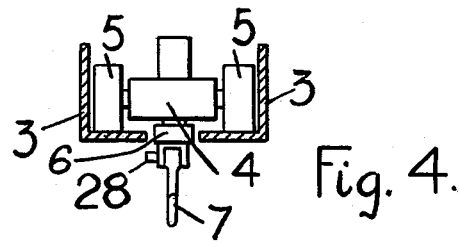
Figure 5:
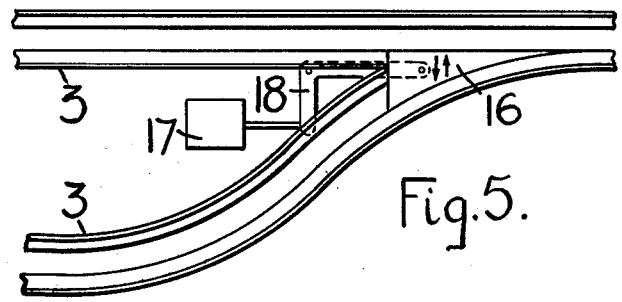
Figure 6:
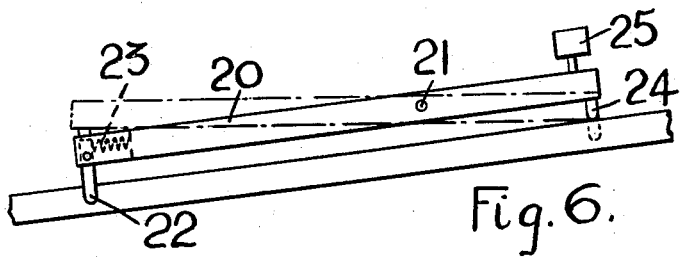
Figure 7:
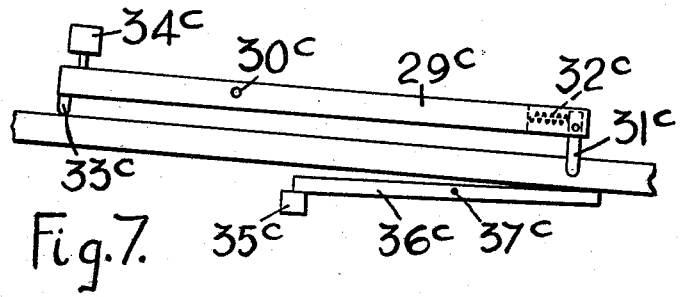

In the accompanying drawings:

FIGURE 1 is a diagrammatic plan of an example of the invention,

FIGURE 2 is a developed diagrammatic side view showing the relative heights of the parts shown in FIGURE 1, FIGURE 3 is a side view of one of the trolleys with a portion of the elevator shown diagrammatically in broken lines, FIGURE 4 is a cross-sectional detail view showing a trolley positioned on the track, FIGURE 5 is a diagrammatic plan view illustrating a preferred form of switching device, FIGURE 6 is a side elevation of a preferred form of magazine storing device through which empty trolleys pass to the loading position, and FIGURE 7 is a side elevation showing a preferred arrangement of magazine storing device for supplying loaded trolleys in batches for delivery to the plucking machine.

Referring to the drawings, there is provided an endless circuit track 1 which at one portion extends through a conventional plucking machine 2, and through a pair of openings 2a formed, respectively, in opposite sides of the upper portion of the plucking machine. The track 1 is formed from a pair of L-section rails 3 (FIGURE 4) each disposed with one flange vertical and at right angles to its other flange which extends from the lower edge of the vertical flange towards the corresponding lower flange of the other rail. The track is, therefore, in the form of a shallow channel having its side walls formed by the vertical flanges of the rails 3, and having its base formed by the other flanges of the rails, the last mentioned flanges being spaced apart to provide a longitudinal slot in the base of the channel.

In engagement with, and movable along, the track 1 are a plurality of trolleys (such as that illustrated at 4 in FIGURE 3) each having two pairs of rollers 5 adapted to roll upon the upper surfaces of the lower flanges of the pair of rails 3, respectively. Moreover, on the underside of the body of each trolley is a further pair of rollers 6 adapted to engage between the inner edges of the lower flanges of the pair of rails 3, respectively, to limit transverse movement of the trolley relative to the track. Also, extending from the underside of each trolley body through the space between the lower flanges of the rails is a hook 7 or other means from which hop bines or the like can be suspended.

The portion 1a of the track 1 within and immediately adjacent the plucking machine 2 (FIGURE 2) is of an undulating form, and for traversing the trolleys 4 along this portion of the track, driving means is provided in association with the machine. This driving means comprises an endless chain 8 or conveyor having at intervals pusher units which are traversable in turn through a guideway (not shown) extending immediately above the portion 1a of the track in the machine. On each pusher unit is a peg 9 adapted to project into a gap between a fixed stop 10 and a resiliently loaded stop 11 on the upper side of the body of each trolley 4 when the latter reaches an appropriate position on the track 1. The arrangement is such that when the peg 9 is in the above mentioned gap the corresponding trolley will be positively traversed through the machine by the endless chain 8 or conveyor from an inlet point X to an outlet point Y. During this movement the trolley will move relative to the conventional plucking means (not shown) within the machine 2 for enabling any bines or the like suspended from the trolley to be plucked. Moreover, should the peg 9 not initially engage the above mentioned gap, the resiliently loaded stop 11 can be depressed by the peg 9 as it overtakes the corresponding trolley until the correct engagement is achieved.

From the outlet point Y the track 1 is inclined downwardly to a loading position Z at which the trolleys are loadable with hop bines or the like, and which is considerably lower than the part of the plucking machine 2 through which the track portion 1a extends. Just in advance of the loading position Z is a switching device 12 (to be hereinafter described) at which point the track 1 become double (the double portions being indicated by the references 1b, 1c) as far as another switching device 13 (similar to the device 12) just before the inlet point X. In the loading position Z the portions 1b and 1c of the track extend parallel so that a vehicle 14 can be disposed between them.

Beyond the loading position Z the track portions 1b, 1c incline upwardly and have associated with them elevating means 15b, 15c, respectively, which are similar in principle to the endless chain or conveyor 8 in association with the plucking machine 2. From the elevating means 15b, 15c the double track portions 1b, 1c inclined downwardly through the switching device 13 (for directing trolleys from the double track portions on to a single track portion) to the machine inlet point X. Thus the trolleys 4 will travel by gravity to a position in which they are engageable by the endless chain or conveyor 8 passing through the plucking machine.

Referring to FIGURE 5, the switching device 12 includes a plate member 16 which is mounted for sliding movement transversely relative to the straight portion of the track (i.e., in the direction of the arrows) between the position shown wherein it co-operates with the rollers 6 of the trolleys to direct them to the track portion 1b, and an alternative position in which it directs them to the track portion 1c. The switching device 13 is of identical construction to the switching device 12 and operates in the same way except that it directs trolleys from the double track portions 1b and 1c to the single track portion leading to the inlet side of the plucking machine 2. The switching device 12 is operated by a solenoid 17 through a bell-crank lever 18 pivotally connected at its end respectively, to the armature of the solenoid and the plate member 16; and the device 13 is similarly operated by an independent solenoid 19.

Between the outlet side of the plucking machine 2 and the switching device 12 the single portion of the track 1 is provided with a magazine storing device 20 comprising a longitudinally extending member or structure pivoted at 21 on a fixed horizontal axis so that the outlet end of the magazine storing device is normally lower than its inlet end (as shown in full lines in FIGURE 6) and in this position a stop 22, which is mounted on the outlet end of the magazine storing device, and which is preferably resiliently loaded as by means of a spring 23 (FIGURE 6), forms an abutment for arresting trolleys 4 running into the magazine storing device. The inlet end of the magazine storing device 20 is provided with a downwardly extending member 24, which, when the outlet end of the magazine storing device is raised, moves downwards to form a stop preventing further entry of trolleys into the magazine storing device while it is being emptied. The magazine storing device 20 may be operated by means of a solenoid 25 connected, for example, to the inlet end thereof. Adjacent the loading position Z a micro switch 26b is associated with the track portion 1b and operable by means of a pivoted bar 27b engageable by rollers or projections 28 on the trolleys (FIGURE 4). Similarly, a micro switch 26c is associated with the track portion 1c and is operable by a pivoted bar 27c.

Immediately in advance of the switching device 13 the track portions 1b, 1c are provided, respectively, with magazine storing devices 29b, 29c, which are of similar construction to the magazine storing device 20. As shown in FIGURE 7, the magazine storing device 29c comprises a longitudinally extending member or structure pivoted at a point 30c on a fixed horizontal axis so that the outlet end of this magazine storing device is normally lower than its inlet end (as shown in FIGURE 7), and in this position a stop 31c, which is mounted on the outlet end of the magazine storing device 29c, and which is preferably resiliently loaded (as shown) by means of a spring 32c forms an abutment for arresting trolleys 4 running into the magazine storing device 29c. The inlet end of the magazine storing device 29c is provided with a stop 33c for preventing trolleys from entering this magazine storing device when the outlet end is raised. The magazine storing device 29b is identical in construction to the magazine storing device 29c. The outlet ends of the magazine storing device 29b, 29c can be raised respectively by means of solenoids 34b, 34c which are arranged to be energised respectively by the closing of micro-switches 35b, 35c. The micro-switches 35b, 35c are operated, respectively, by means of levers 36b, 36c pivoted at 37b, 37c, respectively, and extending longitudinally beneath the parts of the track portions 1b, 1c below the magazine storing devices 29b, 29c (see FIGURE 7). The levers 36b, 36c are engageable by the lower parts of the trolleys, so that as the first trolley leaves one of the magazine storing devices 29b, 29c the associated micro-switch is opened and is maintained open until the last trolley from the magazine has disengaged the lever. Each of the micro-switches 35b, 35c is connected to a timer or delay switch, and the arrangement is such that after one of the micro-switches has been closed the timer or delay switch operates after a predetermined interval to de-energise the solenoid 34b or 34c of the magazine storing device which has just been emptied, and to energise the solenoid of the other magazine storing device and to energise the solenoid 19 so as to move the switching device 13 to a position for permitting the travel of trolleys from the last mentioned magazine storing device. The predetermined interval after which the timer or delay switch operates is so chosen that the switching device 13 will not be moved until all the trolleys from the magazine storing device 29b or 29c which has just been emptied have had time to roll on to the single track portion leading from the switching device 13 to the inlet side of the plucking machine 2.

When the conveyor system described above is in use, a vehicle 14 containing hop bines is positioned at the loading position Z. The hop bines or the like are loaded onto the hooks 7 of the trolleys 4 on the pairs of track portions 1b, 1c by two operators on the vehicle. After being loaded, the trolleys are moved manually as far as the elevators 15b, 15c and then proceed up the elevators from whence they gravitate to the magazine storing devices 29b, 29c respectively. The magazine storing devices 29b, 29c control the rate at which trolleys are fed to the plucking machine 2 so that trolleys are not fed at a rate in excess of the capacity of the plucking machine. The parts of the track portions 1b, 1c between the magazine storing devices 29b, 29c and the tops of the elevators 15b, 15c constitute storage spaces in which loaded trolleys will be stored if they are passed to the elevators at a rate in excess of the capacity of the plucking machine. Thus, there will be a reserve of loaded trolleys which can be passed on to the plucking machine at time when no trolleys are being loaded with bines or the like (as when a fresh vehicle 14 is being positioned in the loading position Z), and, provided that the average rate at which the trolleys are loaded with bines or the like is equal to the capacity of the plucking machine, the plucking machine can always be kept working at its full capacity.

In normal operation, both the micro switches 26b, 26c, controlling the magazine 20, are open when there is a full supply of trolleys at the loading position Z and a batch of empty trolleys is stored in the magazine 20. The bars 27b, 27c are positioned and arranged so that when the number of trolleys 4 at the loading position Z on either of the track portions 1b and 1c falls to a predetermined minimum, e.g., 5, the last trolley disengages from the associated bar 27b or 27c, with the result that the associated micro switch closes and energises the solenoid 25 to release a batch of trolleys from the magazine storing device 20, and at the same time energises the solenoid 17, if necessary, so that the switching device 12 is positioned to direct the trolleys to the track portion where they are required. On arrival of a fresh batch of trolleys at the loading position, the associated micro switch is again opened so that the solenoid 25 is de-energised to allow the magazine storing device 20 to return to the normal position for filling with further trolleys. Manually operable switches (not shown) are preferably provided for over-riding the micro switches 26b, 26c and operating the magazine storing device 20 and switching device 12 under manual control if required.

It will be appreciated that by providing twin loading positions, the operators are able to load bines on to the trolleys at a faster overall rate than required by the rate of flow of trolleys through the plucking machine 2. Moreover, the trolleys 4 are stationary at the loading position and this facilitates the loading operation, each trolley as it is loaded, being passed forward manually for engagement by the respective elevator 15b or 15c. The provision of the magazine 29b, 29c ensures that there is always an adequate supply of loaded trolleys for delivery to the single portion of the track 1 thence to the plucking machine, while the provision of the magazine 20 ensures that there is always available a batch of empty trolleys for delivery to one or other of the loading positions. Furthermore, the loading of the trolleys 4 can be effected at a conveniently low position in spite of the fact that the trolleys are required to pass through a relatively high part of the plucking machine 2.

Having thus described our invention what we claim as new and desire to secure by Letters Patent is:

1. A conveyor system for feeding hop bines or the like to a plucking machine, and comprising in combination with the plucking machine, an endless track which has a part extending through the interior of said plucking machine, and through a pair of openings formed respectively in opposite sides of the upper portion of said plucking machine, at least one other part extending, at a lower level than said openings, between the entrance and exit ends of a loading position spaced laterally from the lower portion of said plucking machine, upwardly and downwardly inclined parts between the exit end of said loading position and one end of the first mentioned part, and additional downwardly inclined parts between the other end of the first mentioned part and the entrance end of said loading position, a plurality of trolleys which are in engagement with, and movable along, said track, and from which the bines or the like can be suspended at said loading position, driving means associated with said plucking machine, and engageable with said trolleys for moving them through said plucking machine to a position from which they can gravitate along the additional downwardly inclined parts of said track to the entrance end of said loading position, elevating means which are engageable with said trolleys at the exit end of said loading position, and through the medium of which said trolleys are movable up at least one of the first mentioned inclined parts of said track to a position from which said trolleys can gravitate to another position in which said trolleys are engageable by said driving means so as to be movable thereby through said plucking machine, releasable means for arresting movement of said trolleys at a position between said elevating means and said plucking machine, and additional releasable means for arresting movement of said trolleys at a position between said plucking machine and the entrance end of said loading position.

2. A conveyor system according to claim 1, wherein said track has a pair of parts extending in laterally spaced relationship between and beyond the entrance and exit ends of said loading position, and has associated therewith a first switching device under the control of which said trolleys, after leaving said plucking machine, are directable alternatively to the said pair of parts of said track, and a second switching device under the control of which said trolleys are directable alternatively from each of the said pair of parts of said track to another part of said track leading to said plucking machine.

3. A conveyor system according to claim 2, wherein said elevating means comprises a pair of elevating devices associated respectively with the said pair of parts of said track at the exit end of said loading position, said second switching device being located near the trolley entrance side of said plucking machine.

4. A conveyor system according to claim 3, and having a first magazine storing device which is associated with said track at a position between said first switching device and said plucking machine, and which incorporates said releasable means for arresting movement of said trolleys between said plucking machine and the entrance end of said loading position, so that said trolleys are arrestable within said magazine storing device until required in said loading position.

5. A conveyor system according to claim 4, and having a pair of additional magazine storing devices which are associated respectively with the said pair of parts of said track at positions in advance of said second switching device, and which incorporate said releasable means for arresting movement of said trolleys between said elevating means and said plucking machine, so that said trolleys are arrestable within said additional magazine storing devices which are alternatively movable for releasing the trolleys therein, said additional magazine storing devices having associated therewith means for controlling said second switching device so that the position of the latter is appropriately set when the trolleys in either of said additional magazine storing devices are released.

6. A conveyor system according to claim 5, and having adjacent said loading position, switch means by which said first switching device and said first magazine storing device are controllable.

7. A conveyor system according to claim 6, wherein said switch means are responsive to movement of said trolleys within said loading position.

8. A conveyor system according to claim 5, wherein said pair of additional magazine storing devices are spaced from the upper ends of said pair of elevating devices, and said trolleys, after being loaded in said loading position and raised by said elevating devices, are storable on parts of said track extending between said elevating devices and said additional pair of magazine storing devices.

9. A conveyor system according to claim 5, wherein each magazine storing device serves to accommodate a predetermined number of said trolleys, and is movable to and from a position for releasing the trolleys therein and arresting movement of the succeeding trolleys on said track.

References Cited in the file of this patent
UNITED STATES PATENTS

| | | |
|---|---|---|
| 1,865,788 | Raymond | July 5, 1932 |
| 2,116,430 | Gordon | May 3, 1938 |
| 2,757,785 | Dauenhauer | Apr. 7, 1956 |
| 2,832,297 | Daniels | Apr. 29, 1958 |
| 2,836,128 | Dauenhauer | May 27, 1958 |
| 2,868,138 | Bishop et al. | Jan. 13, 1959 |
| 2,875,704 | Yates | Mar. 3, 1959 |